H. E. POWELL.
CREAM SEPARATOR.
APPLICATION FILED JULY 3, 1915.
1,170,328.
Patented Feb. 1, 1916.
2 SHEETS—SHEET 1.
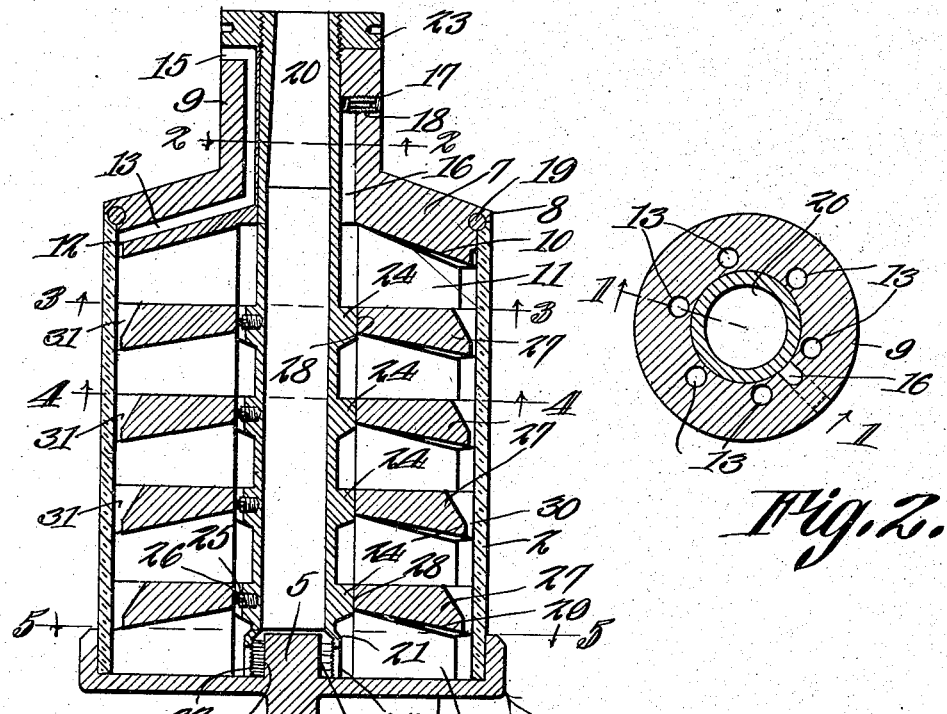
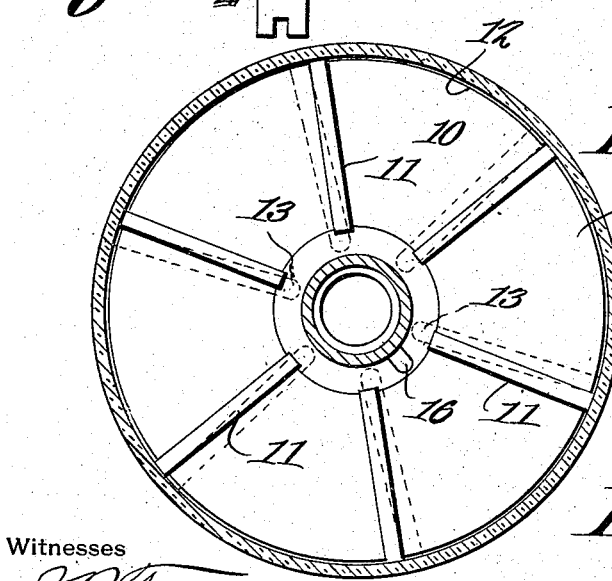
H. E. Powell, Inventor,
by C. A. Snow & Co., Attorneys.

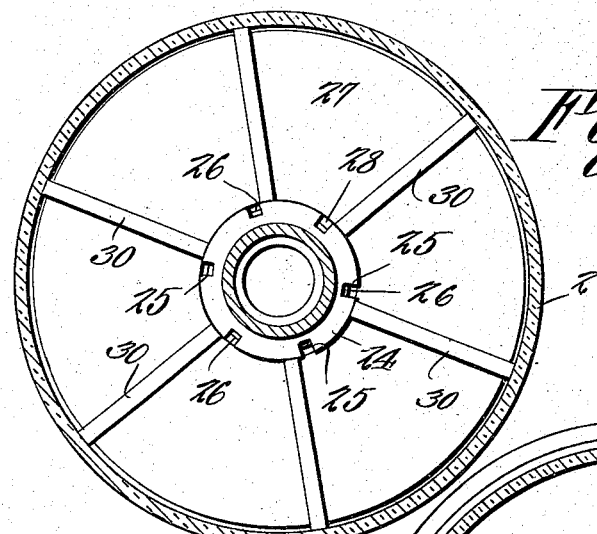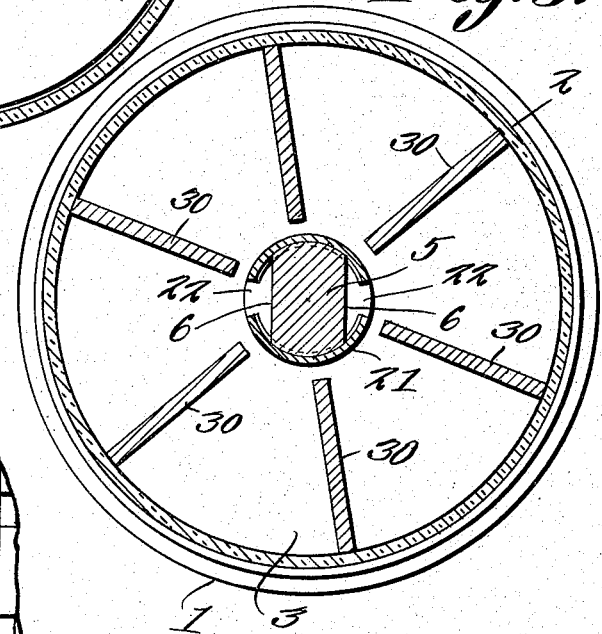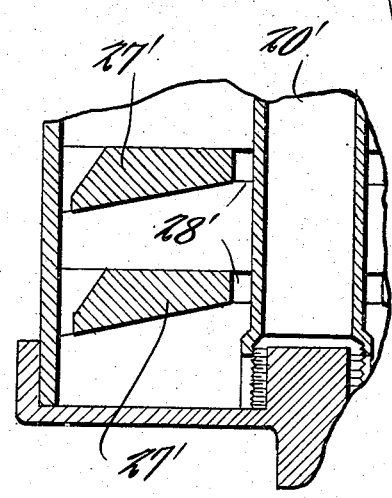

UNITED STATES PATENT OFFICE.

HARRY E. POWELL, OF KOKOMO, INDIANA.

CREAM-SEPARATOR.

1,170,328. Specification of Letters Patent. Patented Feb. 1, 1916.

Application filed July 3, 1915. Serial No. 37,995.

*To all whom it may concern:*

Be it known that I, HARRY E. POWELL, a citizen of the United States, residing at Kokomo, in the county of Howard and State of Indiana, have invented a new and useful Cream-Separator, of which the following is a specification.

The present invention appertains to cream separators, and aims to provide a novel and improved centrifugal cream separator.

It is the object of the invention to provide a cream separator embodying a unique assemblage of the component elements whereby the utility and efficiency of the separator is enhanced, the interior of the device comprising a novel built up structure, and the device being improved generally in its details, whereby it will serve its office in a thoroughly satisfactory and effective manner.

It is also within the scope of the invention to provide a cream separator having the foregoing advantages, and which at the same time, is comparatively simple and inexpensive in construction.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a central vertical section of the improved device. Figs. 2, 3, 4 and 5 are enlarged horizontal cross sectional views, taken on the lines 2—2, 3—3, 4—4 and 5—5, respectively, of Fig. 1. Fig. 6 is a fragmental section illustrating a modification.

The present invention resides in the construction of the rotor of the separator, and the framework and other parts of the separator have therefore been eliminated from the drawings and specification, since they are common and well known, the present rotor being mounted for rotation in the ordinary or any well known manner.

The rotor embodies a bowl 1, composed of a cylindrical shell 2, and a bottom plate 3 attached to the lower end thereof. This bottom plate 3 has a central depending trunnion or spindle 4 for journaling the bowl to the supporting frame (not shown), whereby the bowl may be rotated as usual. The bottom plate 3 also has a central upstanding stud 5 provided with opposite flattened sides 6.

Fitted within the upper end or mouth of the bowl 1, or the shell 2 thereof, is a cover 7 therefor, which is provided with an outstanding annular flange 8 seating upon the rim or shell of the bowl. The cover 7 has a central upstanding neck 9, and the bottom of the cover 7 is inclined from the periphery or margin of the cover to the central portion thereof, the bore of the neck 9 extending through the cover. The cover 7 has a plurality of radial extending wings 11, and the periphery of the cover 7 is reduced slightly in diameter, as at 12, adjacent the bottom or lower face of the cover. The cover 7 has a plurality of converging skim milk passages 13 extending from the reduced portion 12 to and upwardly within the neck 9. The upper ends of the passages 13 extend radially to the periphery of the neck 9, as at 15, to discharge the skim milk. The cover 7 is also provided with a cream outlet passage 16 extending upwardly from the central portion of the cover into the neck 9, adjacent the bore of the neck and cover, and the upper end of the passage 16 extends angularly, as at 17, to the surface of the neck 9 for discharging the cream.

An apertured plug 18 is threaded or mounted adjustably within the upper end portion 17 of the passage 16, and may be threaded inwardly and outwardly to regulate the flow of cream out of the passage 16, it being noted that when the plug 18 is screwed inwardly, it will restrict the flow of cream through the passage 16, and when the plug 18 is threaded outwardly, it will facilitate the discharge of the cream. In this manner, the discharge of cream may be adjusted to a nicety.

An annular gasket 19 is disposed between the upper end of the bowl and the flange 8 for providing a tight joint, to prevent leakage.

An upright or vertical tubular member 20 is disposed axially or concentrically within the bowl and projects snugly through the cover 7 and its neck 9 to protrude slightly above the neck 9. The tubular member 20 has its lower end enlarged, as at 21, and threaded upon the stud 5 to attach said tubular member to the bottom of the bowl, and the lower enlarged end 21 of the tubular member is provided with diametrically opposite openings 22 coöperating with the flattened sides 6 of the stud 5 to provide lower outlets for the member 20, the flattened sides 6 serving to space the stud 5 from the openings 22.

A nut 23 is threaded upon the upper protruding end of the tubular member 20, and seats upon the neck 9 to clamp the cover 7 in place upon the bowl, whereby the parts of the separator are securely held together. The neck 9 may also be journaled to the supporting frame to assist the trunnion 4 in mounting the rotor for rotatory movement.

The tubular member 20 is provided at spaced vertical points within the bowl with annular enlargements or integral collars 24, each of which is provided with an annular series of vertical channels 25 in its periphery. Adjusting screws 26 threadedly engage the collars 24 and project into the channels 25, whereby the adjustment of the screws 26 will serve to regulate the amount of cream permitted to pass upwardly through the channels.

The means for separating the cream from the milk within the bowl embodies a series of superposed units seated one upon the other. Each of said units embodies a disk 27 having a central opening 28 snugly receiving the respective collar 24 of the tubular member 20, to thereby provide an annular horizontal partition within the bowl. The disks 27 as well as the cover 7 and other parts of the structure may be in the form of metal castings, although they may be formed of various materials and in various manners. The lower surfaces of the disks 27 are inclined from the margins or peripheries of the disks toward the centers thereof, as at 29, and each disk 27 is provided with a plurality of depending radial wings 30 fitting snugly within the bowl 1, the same as the wings 11 of the cover. The wings 30 of the lowermost disk 27 seat upon the bottom of the bowl, while the wings of the other disks seat upon the disks below them, and the wings 11 of the cover seat upon the uppermost disk 27, whereby the said disks are firmly held in place within the bowl to prevent their displacement. Each of the disks 27 is of smaller diameter than the internal diameter of the bowl, the disks decreasing in diameter from the uppermost one to the lowermost one. Thus, the uppermost disk is of slightly smaller diameter than the reduced portion 12 of the cover, and the successive disks from the upper one down are each smaller in diameter than the upper one. This provides annular slots or spaces between the rim or shell 2 of the bowl and the peripheries of the disks 27, which slots increase in width from the upper one to the lowermost one.

The peripheries of the disks 27 are provided with upper annular bevels 31.

In operation, the milk is poured down the tubular member or pipe 20, and flows into the bowl by way of the lower outlet openings 22 of the tubular member 20, so that the milk enters the bowl adjacent the bottom thereof. The device is rotated, as usual, to provide the centrifugal action, it being understood that the milk being of greater specific gravity than the cream will tend to move toward and against the walls of the bowl, while the cream will be carried toward the center of the bowl by centripetal action. The milk is admitted under the lowermost disk 27, and rises within the bowl, the separation of the cream from the milk being accomplished by the successive disks 27. The relative wide annular slot between the lowermost disk 27 and shell 2 of the bowl allows the milk to flow upwardly readily therethrough, while the conical lower surface of the said disk 27 will direct the cream toward the center, the cream flowing upwardly through the lower set of channels 25. The annular slot between the next disk 27 and the shell 2 is slightly narrower, to restrict the upward flow of milk therethrough, so that any cream flowing upwardly through the lower annular slot with the milk will be given an opportunity to pass inwardly under the second disk 27 to be carried to the center. This action continues on upward at each disk 27, and practically all of the cream is finally separated from the milk by the successive separating actions accomplished by the disks 27. The skim milk rises adjacent the walls of the bowl, while the cream rises centrally of the bowl through the channels 25, the bevels 31 of the disks 27 facilitating the travel of cream therealong toward the center of the bowl when the cream passes upwardly through the annular milk slots. The skim milk passes on upwardly along the walls of the bowl to the lower ends of the passages 13 which terminate adjacent the walls of the bowl, and the skim milk passes upwardly through the passages 13, while the cream will pass on upwardly through the cream passage 16 communicating with the central portion of the bowl. Suitable means (not shown), are provided, as usual, for catching the skim milk and cream delivered from the rotor. The course of the skim milk is indicated in Fig. 1, by full line arrows, while the course of the cream is indicated by dotted line arrows.

It will be noted that the wings 11 and 30 not only serve to space the disks 27 apart properly, but also serve to carry the milk and cream around with the bowl when the bowl is rotated to facilitate the centrifugal and centripetal actions of the milk and cream, respectively within the bowl.

The parts of the device may be readily assembled and separated, it being noted that when the device is assembled, the disks 27 may be set one upon the other conveniently in placing them within the bowl, without special means being employed for mounting the disks or partitions 27 in place.

In Fig. 6, a modification is depicted, the tubular member 20' in this case not being provided with the enlargements or collars 24, so that the openings 28' of the disks 27' allow the cream to flow upwardly adjacent the tubular member 20'. This form is of simplified construction, but does not have the controlling screws 26 for regulating the upward flow of cream, as does the first form of the invention.

The present appliance has numerous advantages which will be obvious to those skilled in the art, it is thought, in connection with the foregoing.

Having thus described the invention, what is claimed as new is:

1. In a separator, a rotary bowl, superposed disks therein of smaller diameter than the internal diameter of the bowl, the disks having depending radial wings fitting snugly within the bowl, the wings of the lowermost disk seating upon the bottom of the bowl, and the other wings seating upon the disks below them, the disks having central openings, the lower surfaces of the disks being inclined from the margins of the disks toward their centers, and the peripheries of the disks having upper bevels.

2. In a separator, a bowl having a stud upstanding centrally from its bottom and provided with a flattened side, a cover for the bowl, an upright tubular member having its lower end threaded upon the stud and provided with an outlet opening coöperating said flattened side of the stud, the tubular member projecting upwardly through the cover, a member engaged upon the tubular member and seating upon the cover for holding it in place, and superposed annular separating members within the bowl having means for separating them from one another and from the bowl bottom and cover.

3. In a separator, a bowl, an axial upstanding tubular member within the bowl having a lower opening, and having vertically spaced collars provided with vertical channels, annular separating members within the bowl around said collars, and means for regulating the flow of liquid through said channels.

4. In a separator, a bowl, an axial upstanding tubular member within the bowl having a lower opening, and having vertically spaced collars provided with vertical channels, annular separating members within the bowl around said collars, and adjusting screws threadedly engaging the collars and projecting into said channels.

In testimony that I claim the foregoing as my own, I have hereto affixed my signature in the presence of two witnesses.

HARRY E. POWELL.

Witnesses:
V. V. BEAN,
C. B. HAWLEY, Jr.